United States Patent
Rossie et al.

[11] 3,788,686
[45] Jan. 29, 1974

[54] CAR BODY FOR MOTOR VEHICLES

[75] Inventors: Egbert Rossie, Ingolstadt; Bernd Barke, Ettling, both of Germany

[73] Assignee: Audi NSU Auto Union A.g., Ingolstadt, Germany

[22] Filed: June 23, 1971

[21] Appl. No.: 155,960

[30] Foreign Application Priority Data
July 7, 1970  Germany................... P 20 33 531.3

[52] U.S. Cl.......... 296/146, 180/82 R, 292/DIG. 39
[51] Int. Cl................................................. B60j 5/04
[58] Field of Search 296/146; 180/112, 113; 49/396, 49/467, 483; 292/DIG. 39, DIG. 40

[56] References Cited
UNITED STATES PATENTS

| 1,192,733 | 7/1916 | Bennett | 292/DIG. 40 |
| 2,815,085 | 12/1957 | Whipple | 180/113 |
| 1,350,108 | 8/1920 | Mitchell | 49/396 X |
| 1,775,974 | 9/1930 | Solms | 49/396 |
| 1,902,499 | 3/1933 | Herreshoff | 49/483 X |
| 2,080,714 | 5/1937 | Hicks et al. | 296/146 |
| 2,709,612 | 5/1955 | Fox | 292/DIG. 39 |
| 2,743,773 | 5/1956 | Weiertz | 296/146 X |

Primary Examiner—Kenneth H. Betts
Assistant Examiner—L. J. Paperner
Attorney, Agent, or Firm—V. Alexander Scher et al.

[57] ABSTRACT

A motor vehicle is provided with a device protecting it from accidents affecting the sides of the car body. The device includes a hook fixed to each door of the car and having a recess directed toward the interior of the car.

3 Claims, 6 Drawing Figures

CAR BODY FOR MOTOR VEHICLES

This invention relates to a device protecting a motor car body from accidents directed to its sides.

Usual car doors do not provide sufficient resistance against the force of another car striking them from the side or the front. Then the door is compressed in the middle and is folded while its ends are raised from its supporting surface upon the lower beams of the car body.

It is known in the art to provide a locking device or a door safety device having a hook the axis of which extends transversely to the longitudinal direction of the vehicle and which is operated by hand by a complicated leverage.

An object of the present invention is to provide a car door which will produce effective resistance against form changes by a striking vehicle without any additional operations.

Other objects will become apparent in the course of the following specification.

In the accomplishment of the objectives of the present invention it was found desirable to fix a hook to the door and to direct its recess toward the interior of the car. If a striking car moves from the front at an inclined direction it will have to overcome the resistance to shape change not solely of the door, but the combined resistance of the door and the car body. Consequently the projecting parts of the striking car will not be able to penetrate sufficiently deep into the interior to hurt the passengers.

Furthermore, a preferably semi-round recess can be provided for the hook at the door, for example, in the longitudinal beam, and the recess can be partially covered by a holding plate. Thus the hook engages a very advantageously shaped part of the car body.

The hook can be also fixed to a strengthening plate of the door, extending from its inner wall to the outer wall and S-shaped in cross-section. This makes certain that the door will not be torn at the location wherein the hook connects it with the car body. When several hooks are used they are all fixed to a correspondingly long strengthening plate. Then the plate not only provides a firm connection between the inner and outer walls of the door but also constitutes an additional support in the door.

The hook extends with a semicircular edge under the holding plate to be able to transmit large forces between the door and, for example, the longitudinal beams.

To provide a firm connection it is advantageous to fix the hook by a semicircular edge with the door wall.

To improve the connection of the holding plate it is possible to provide an annular flange between the outer edge and the inner edge of the plate.

The recess can be provided in a flange of the longitudinal beam, for example, and the outer and inner edges of the plate can end flush with a flange edge of the longitudinal beam, for example. Then the hook and the plate do not interfere with the entry of passengers into the car or with the cleaning of the car body.

Finally, the hook can be also arranged close to the lower edge of the door under the lock. Forces produced when a car coming at an angle from the front strikes the door are then divided and received on the front edge of the door by the two hinges and at the rear edge by the lock and the hook. The door is firmly fixed in the car body and the penetration depth of the buffer bar, for example is smaller.

Furthermore, in case of an accident, the door will remain closed with greater probability due to the fact that in accordance with the present invention, forces on the lock are relieved.

The invention will appear more clearly from the following detailed description when taken in connection with the accompanying drawings showing by eay of example only, preferred embodiments of the inventive idea.

Figure 3:
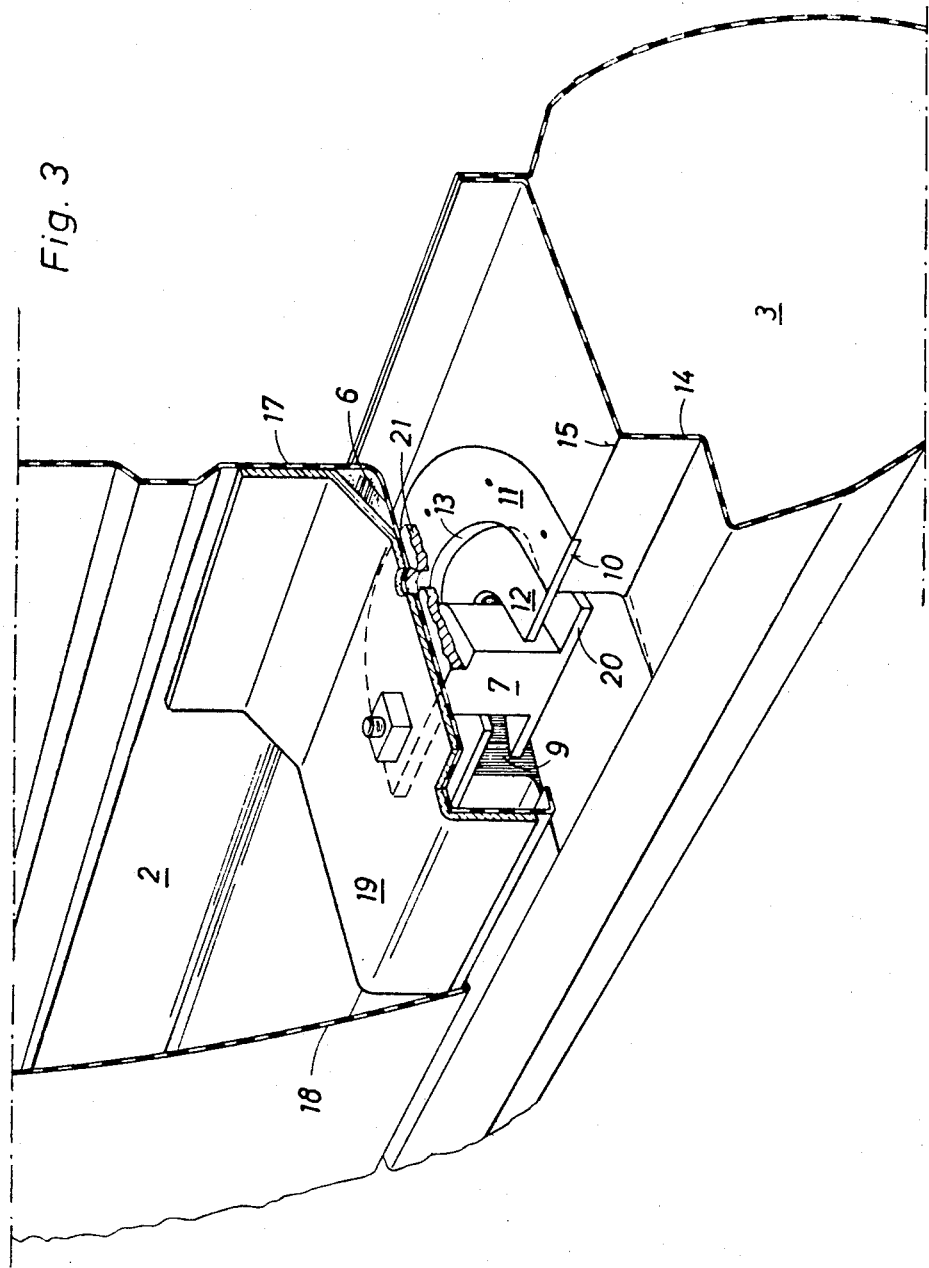
FIG. 3 is a perspective partly sectional view of the parts shown in FIG. 1. For better illustration several sectional planes and broken off parts are shown.
Figure 4:
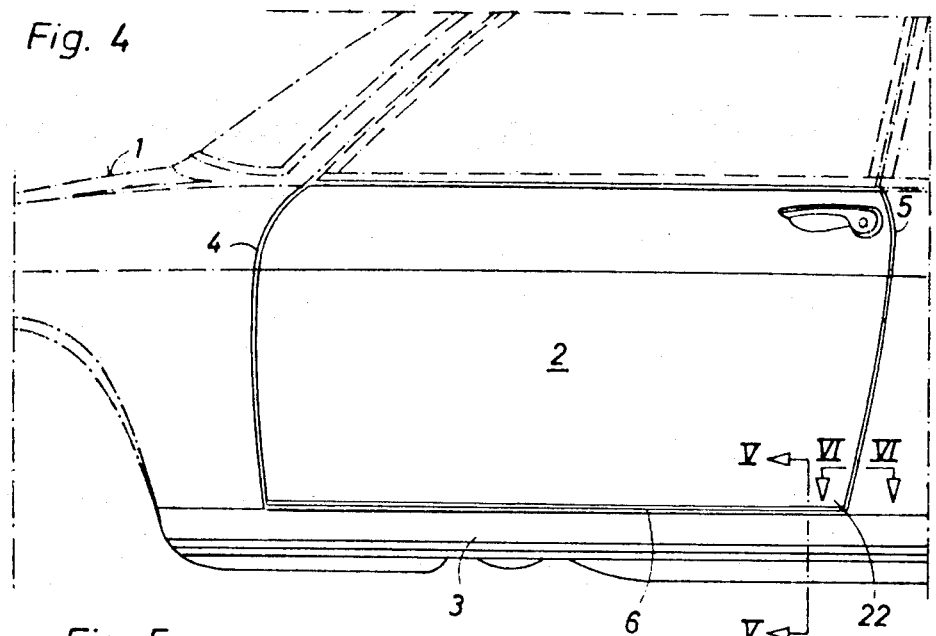
FIG. 4 is a side view of a car door.

The drawings show a car body 1 provided with a door 2. A longitudinal beam 3 is located under the door 2. The door is swingable at 4 about a vertical axis and can be locked at 5 by a lock. A hook 7 is attached to the lower wall 6 of the door 2 and extends into the beam 3. The hook is provided with a recess 8 directed toward the interior. A recess 9 is provided in the beam 3 for the hook (FIG. 3). A step 13 is located between the semicircular outer edge 11 and the semicircular inner edge 12 of the holding plate 10. The recess 9 for the hook 7 is provided in a step 14 of the longitudinal beam 3. The outer edge 11 and the inner edge 12 of the plate 10 both end in the edge 13 of the step 14 of the beam 3.

The semicircular recess 9 is partly covered by the inner edge 12 of the plate 10. The hook 7 is fixed to a strengthening plate 19 which is S-shaped in cross-section and which extends from the inner wall 17 to the outer wall 18 of the door 2. When the door is closed, the semicircular edge 20 of the hook 7 engages under the inner edge 12 of the plate 10. The hook 7 is fixed with a semicircular edge 21 at the lower wall 6 of the door 2. In case of a collision with a car striking from the front in an inclined direction the closed door 2 is firmly connected with the longitudinal beam 3.

Figure 1:
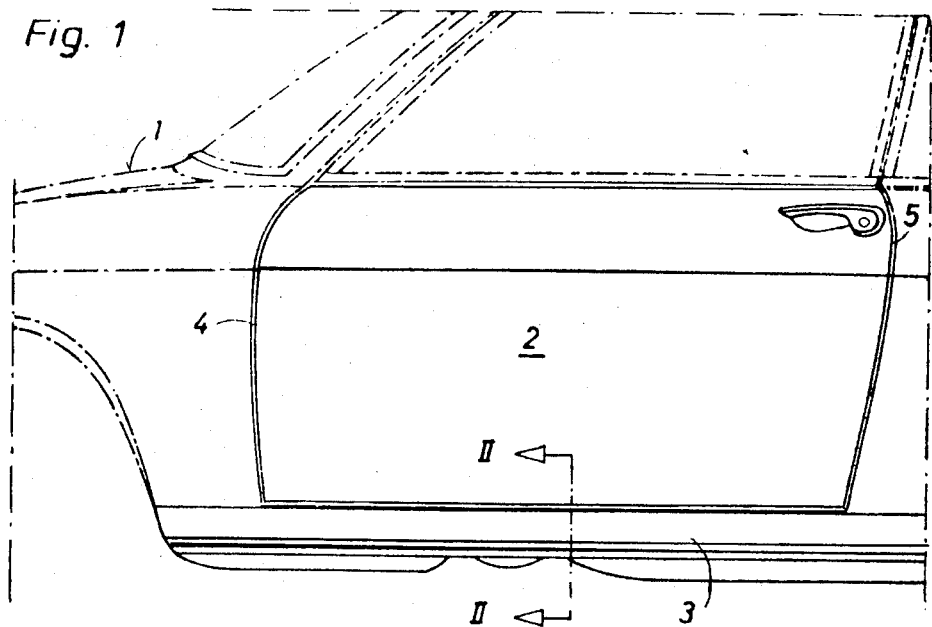
FIG. 1 is a side view showing a car door and adjacent parts of the car body.
Figure 2:
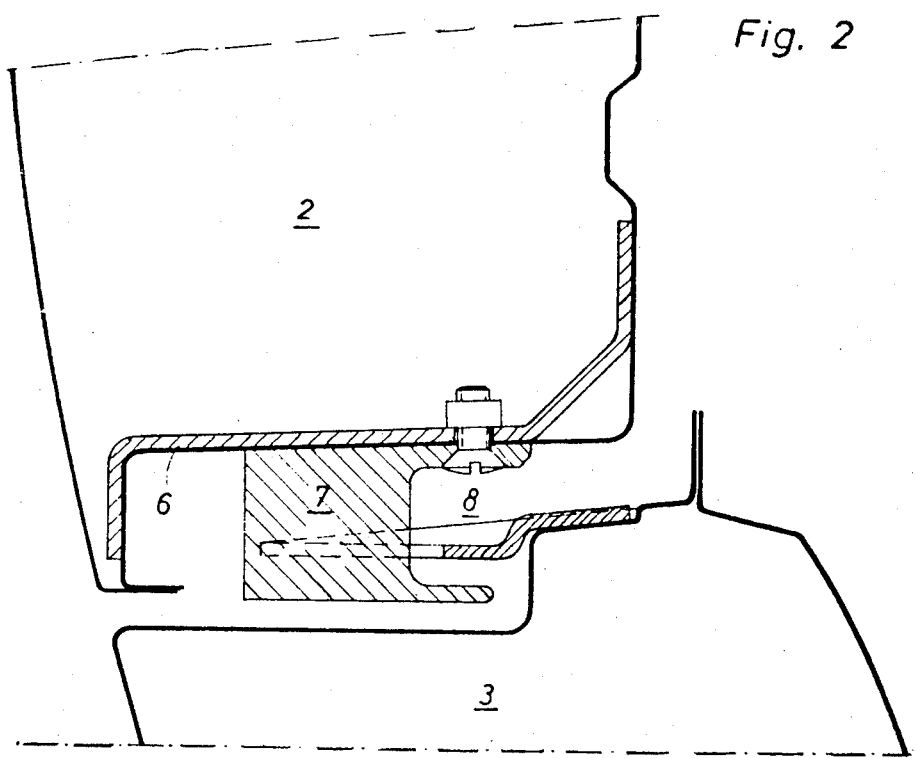
FIG. 2 is a section along the line II—II of FIG. 1 on an enlarged scale.

When the door 2 is opened to receive or discharge passengers, it swings at 4 about its hinges (FIG. 1). Then the hook 7 moves along a substantially horizontal circular path out of the recess 9 and under the plate 10. A passenger entering the car does not see the hook 7 and cannot come into any contact with it which may be disturbing, since the hook is located under the door. The plate 10 which joins the edge 13 of the beam 3 also does not disturb the users of the car or its cleaning.

According to a construction which is better from the point of view of force transmission the lower wall of the door 2 with the hook (not shown) can engage the beam 3 close to the door corner 22.

Figure 5:
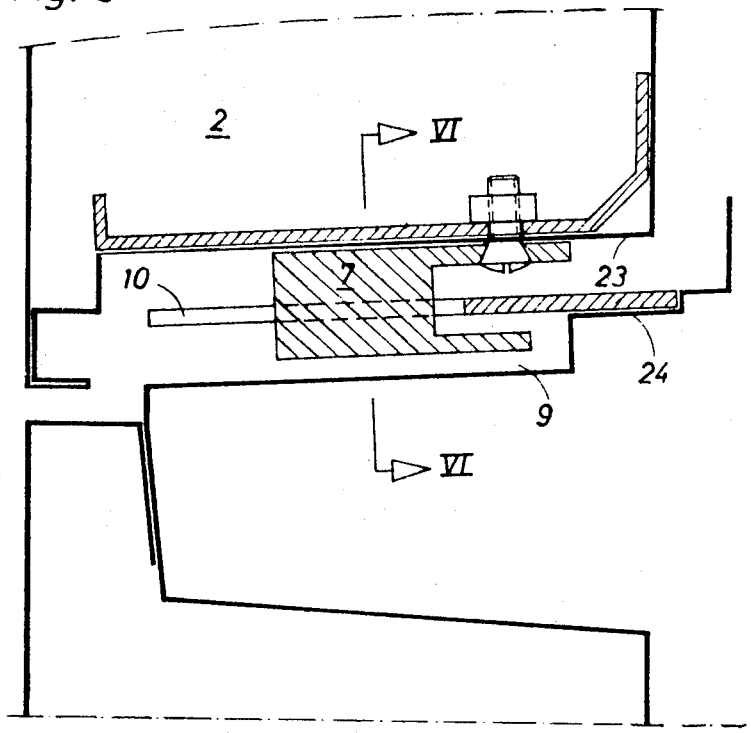
FIG. 5 is a section along the line V—V of FIG. 4 on an enlarged scale.
Figure 6:
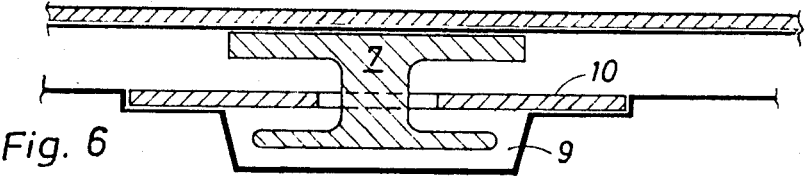
FIG. 6 is a section along the line VI—VI of FIG. 5.

Furthermore, as shown in FIG. 5, the hook 7 can be fixed to the rear wall 23 of the door 2, so that the door and the hook can engage the rear post 24 of the door opening. In that case when the door 2 is closed the hook 7 engages under the plate 10 which covers the recess 9.

Another advantageous construction consists in that the lower door wall 6 engages the beam 3 with a hook 7 in the middle of the door 2 and wherein the door 2 is provided with a further hook 7 located at the rear wall 23 and engaging the rear post 24. In that case the force of a forwardly striking car must not only overcome the resistance of the door 2 and the beam 3, but the door 2 presents a greater resistance since at one side it is connected at 4 with the two hinges, and at the other side it is connected with the lock at 5, while it is firmly connected with the car body by a further hook 7 adjacent the corner 22.

We claim:

1. A device protecting a car body having side doors against accidents affecting the doors, the device comprising at least one hook attached to the door and having a recess extending toward the interior of the car body, and a plate which is S-shaped in cross-section and extends from the inner wall to the outer wall of the door, said plate being attached to the door, said hook being attached to said plate.

2. A device protecting a car body having side doors against accidents affecting the doors, the car body having a longitudinal beam with a step-like portion and a substantially semicircular recess located in said step-like portion, said device comprising at least one hook attached to the door and having a recess extending toward the interior of the car body, said hook fitting into said beam recess, and a cover having an annular step between its outer edge and its outer edge and partly covering said beam recess, said hook having a semicircular edge engaging under an inner edge of said cover.

3. A device in accordance with claim 2, wherein the outer edge and the inner edge of said cover ends flush with the edge of the step portion of the beam.

* * * * *